US012691837B2

(12) United States Patent
Wada et al.

(10) Patent No.: US 12,691,837 B2
(45) Date of Patent: Jul. 28, 2026

(54) POWER FEEDING CONTROL APPARATUS, POWER FEEDING CONTROL SYSTEM, AND POWER FEEDING CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kenya Wada, Yokkaichi (JP); Shogo Kamiguchi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 31 days.

(21) Appl. No.: 18/844,180

(22) PCT Filed: Feb. 27, 2023

(86) PCT No.: PCT/JP2023/006955
§ 371 (c)(1),
(2) Date: Sep. 5, 2024

(87) PCT Pub. No.: WO2023/171439
PCT Pub. Date: Sep. 14, 2023

(65) Prior Publication Data
US 2025/0170973 A1 May 29, 2025

(30) Foreign Application Priority Data
Mar. 7, 2022 (JP) ................................. 2022-034489

(51) Int. Cl.
*B60R 16/023* (2006.01)
*B60R 16/02* (2006.01)
(Continued)

(52) U.S. Cl.
CPC .......... *B60R 16/0232* (2013.01); *B60R 16/02* (2013.01); *H04L 12/28* (2013.01);
(Continued)

(58) Field of Classification Search
CPC ................ B60R 16/0232; B60R 16/02; H04L 12/40039; H04L 2012/40273; H04L 12/28; H04L 43/0823
See application file for complete search history.

(56) References Cited

U.S. PATENT DOCUMENTS

| | | | | |
|---|---|---|---|---|
| 7,750,497 | B2 * | 7/2010 | Hashimoto | ............... H02J 1/14 307/10.1 |
| 10,471,911 | B2 * | 11/2019 | Tateishi | .................. H04L 47/28 |
| 2009/0316320 | A1 * | 12/2009 | Maeda | ................... B60R 16/03 361/92 |

FOREIGN PATENT DOCUMENTS

| | | |
|---|---|---|
| JP | H4-192644 A | 7/1992 |
| JP | 2001-257694 A | 9/2001 |

(Continued)

OTHER PUBLICATIONS

International Search Report, Application No. PCT/JP2023/006955, mailed May 16, 2023. ISA/Japan Patent Office.

*Primary Examiner* — John A Tweel, Jr.
(74) *Attorney, Agent, or Firm* — Brooks Kushman P.C.

(57) ABSTRACT

A plurality of ECUs (communication devices) are mounted in a vehicle and connected to a communication bus. A relay apparatus (power feeding control apparatus) controls power feeding to the plurality of ECUs. The relay apparatus determines whether an abnormality has occurred for data received via the communication bus. If it is determined that the abnormality has occurred, the relay apparatus selects one of the plurality of ECUs, and stops power feeding to the selected ECU. After stopping the power feeding, the relay apparatus determines whether the occurrence of the abnor- (Continued)

mality has stopped. If it is determined that the occurrence of the abnormality has stopped, the relay apparatus maintains the stopping of the power feeding to the selected ECU.

19 Claims, 9 Drawing Sheets

(51) Int. Cl.
H04L 12/28 (2006.01)
H04L 12/40 (2006.01)
H04L 43/0823 (2022.01)

(52) U.S. Cl.
CPC .... H04L 12/40039 (2013.01); H04L 43/0823 (2013.01); *H04L 2012/40273* (2013.01)

(56) References Cited

FOREIGN PATENT DOCUMENTS

| | | |
|---|---|---|
| JP | 2007-272709 A | 10/2007 |
| JP | 2021-181677 A | 11/2021 |

* cited by examiner

FIG. 3

Legend
A: Identification information

State table of ECU 1             T1

| A | Abnormality flag | Level |
|---|---|---|
| 001 | 0 | A |
| 002 | 0 | B |
| 003 | 0 | C |
| 004 | 0 | D |
| 005 | 0 | QM |
| 006 | 1 | QM |
| ⋮ | ⋮ | ⋮ |

ECU1b

ECU1a

FIG. 6

Conditions for determining abnormality

| Condition 1 | For common data including common identification information, data amount of common data received in predetermined period is greater than or equal to threshold. |
|---|---|
| Condition 2 | For common data including common identification information, time interval at which common data is received is less than predetermined interval. |

FIG. 9

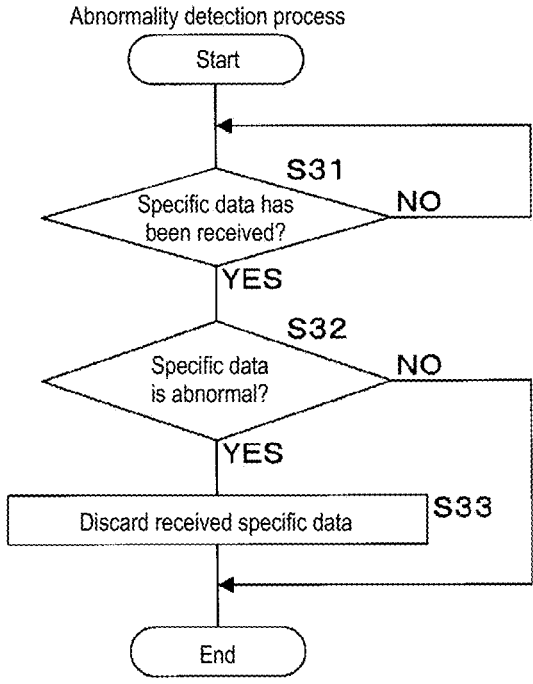

Abnormality detection process

Start

S31
Specific data has been received?    NO

YES

S32
Specific data is abnormal?    NO

YES

Discard received specific data    S33

End

FIG. 10

Abnormality detection process

| | |
|---|---|
| Condition 1 | For common data including common identification information, data amount of common data received in predetermined period is greater than or equal to threshold. |
| Condition 2 | For common data including common identification information, time interval at which common data is received is less than predetermined time interval. |
| Condition 3 | Abnormal specific data has been received. |

POWER FEEDING CONTROL APPARATUS, POWER FEEDING CONTROL SYSTEM, AND POWER FEEDING CONTROL METHOD

CROSS-REFERENCE TO RELATED APPLICATIONS

This application is the U.S. national stage of PCT/JP2023/006955 filed on Feb. 27, 2023, which claims priority of Japanese Patent Application No. JP 2022-034489 filed on Mar. 7, 2022, the contents of which are incorporated herein.

TECHNICAL FIELD

The present disclosure relates to a power feeding control apparatus, a power feeding control system, and a power feeding control method.

BACKGROUND

JP 2021-181677A discloses a communication system in which a plurality of communication devices mounted in a vehicle are connected to a communication bus. Each of the communication devices communicates with other communication devices via the communication bus.

According to JP 2021-181677A, for example, when one communication device has repeatedly transmitted data via the communication bus at short time intervals, an abnormality occurs for the data transmitted via the communication bus. When this abnormality has occurred, the communication bus is occupied by the one communication device, and other communication devices cannot perform communication. In JP 2021-181677A, no consideration is given to a method for stopping the occurrence of an abnormality when the abnormality has occurred for the data transmitted via the communication bus.

The present disclosure has been made in view of such circumstances, and it is an object of the disclosure to provide a power feeding control apparatus, a power feeding control system, and a power feeding control method that can stop the occurrence of an abnormality when the abnormality has occurred for data transmitted via a communication bus.

SUMMARY

A power feeding control apparatus according to an aspect of the present disclosure is a power feeding control apparatus configured to control power feeding to a plurality of communication devices that are mounted in a vehicle and connected to a communication bus, the apparatus including: a receiving unit configured to receive data transmitted via the communication bus; and a processing unit configured to execute a process, wherein the processing unit is configured to: determine whether an abnormality has occurred for the data received by the receiving unit; if it is determined that the abnormality has occurred, select one of the plurality of communication devices; instruct to stop power feeding to the selected communication device; after instructing to stop the power feeding, determine whether the occurrence of the abnormality has stopped; and, if it is determined that the occurrence of the abnormality has stopped, maintain the stopping of the power feeding to the selected communication device.

A power feeding control system according to an aspect of the present disclosure includes: a plurality of communication devices that are mounted in a vehicle and connected to a communication bus; and a power feeding control apparatus configured to control power feeding to the plurality of communication devices, wherein the power feeding control apparatus includes: a receiving unit configured to receive data transmitted via the communication bus; and a processing unit configured to execute a process, and the processing unit is configured to: determine whether an abnormality has occurred for the data received by the receiving unit; if it is determined that the abnormality has occurred, select one of the plurality of communication devices; instruct to stop power feeding to the selected communication device; after instructing to stop the power feeding, determine whether the occurrence of the abnormality has stopped; and, if it is determined that the occurrence of the abnormality has stopped, maintain the stopping of the power feeding to the selected communication device.

A power feeding control method according to an aspect of the present disclosure is a power feeding control method for controlling power feeding to a plurality of communication devices that are mounted in a vehicle and connected to a communication bus, the method causing a computer to execute the steps of determining whether an abnormality has occurred for data transmitted via the communication bus; if it is determined that the abnormality has occurred, selecting one of the plurality of communication devices; instructing to stop power feeding to the selected communication device; after instructing to stop the power feeding, determining whether the occurrence of the abnormality has stopped, wherein if it is determined that the occurrence of the abnormality has stopped, the stopping of the power feeding to the selected communication device is maintained.

Note that the present disclosure can be implemented not only as a power feeding control apparatus including the above-described distinctive processing unit, but also as a power feeding control method including the above-described distinctive processes as steps, or as a computer program for causing a computer to execute such steps. Furthermore, the present disclosure can be implemented as a semiconductor integrated circuit that implements part or all of the power feeding control apparatus, or as a power feeding control system including the power feeding control apparatus.

Effects of the Present Disclosure

According to the above-described aspect, it is possible to stop the occurrence of an abnormality when the abnormality has occurred for data transmitted via a communication bus.

BRIEF DESCRIPTION OF DRAWINGS

FIG. 3 is a diagram showing the details of a state table.

FIG. 6 is a diagram illustrating conditions for determining an abnormality.

FIG. 9 is a flowchart illustrating the procedure of an abnormality detection process.

FIG. 10 is a diagram illustrating conditions for determining an abnormality.

DETAILED DESCRIPTION OF PREFERRED EMBODIMENTS

Figure 1:
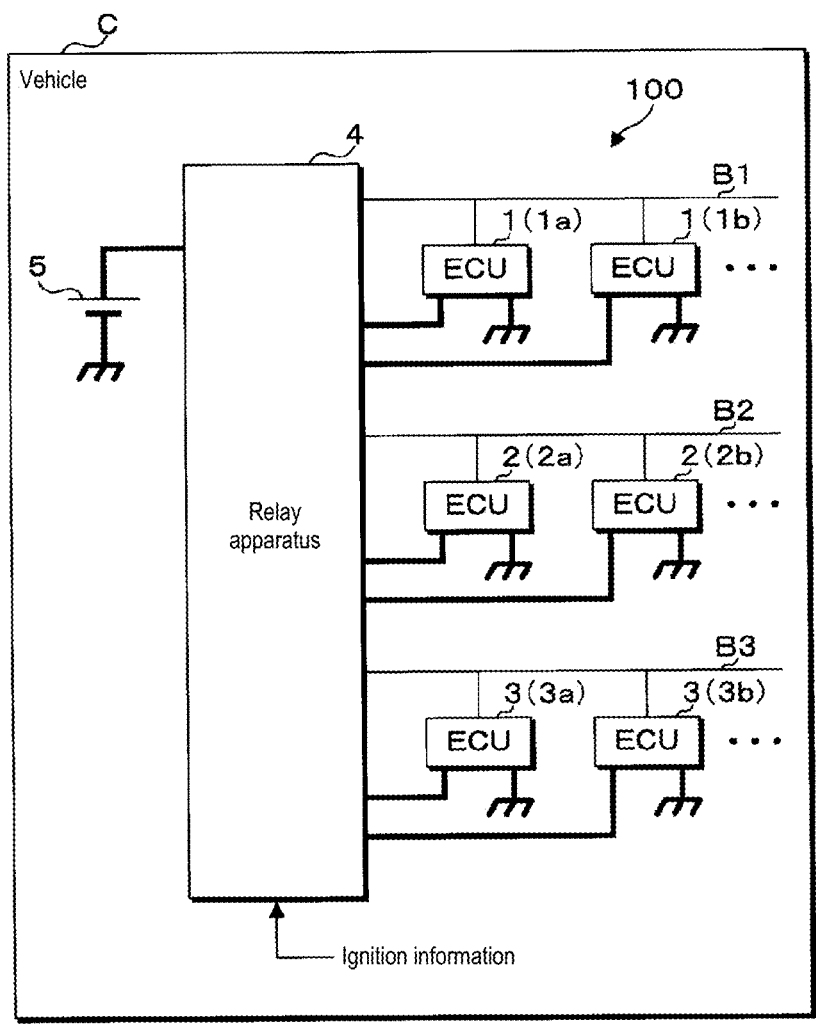
FIG. 1 is a block diagram showing the configuration of relevant portions of a communication system according to Embodiment 1.

First, embodiments of the present disclosure will be listed and described. At least some of the embodiments described below may be combined freely.

In a first aspect, a power feeding control apparatus according to an aspect of the present disclosure is a power feeding control apparatus configured to control power feeding to a plurality of communication devices that are mounted in a vehicle and connected to a communication bus, the apparatus including: a receiving unit configured to receive data transmitted via the communication bus; and a processing unit configured to execute a process, wherein the processing unit is configured to: determine whether an abnormality has occurred for the data received by the receiving unit; if it is determined that the abnormality has occurred, select one of the plurality of communication devices; instruct to stop power feeding to the selected communication device; after instructing to stop the power feeding, determine whether the occurrence of the abnormality has stopped; and, if it is determined that the occurrence of the abnormality has stopped, maintain the stopping of the power feeding to the selected communication device.

In a second aspect, the power feeding control apparatus according to an aspect of the present disclosure, the data transmitted via the communication bus includes identification information for identifying a transmission source of the data, and, for common data including common identification information, if a data amount of the common data received by the receiving unit in a predetermined period is greater than or equal to a threshold, the processing unit determines that the abnormality has occurred.

In a third aspect, the power feeding control apparatus according to an aspect of the present disclosure further includes a second receiving unit configured to receive data transmitted via a second communication bus that is different from the communication bus, wherein the data transmitted via the communication bus includes predetermined specific data, and the processing unit is configured to: if the receiving unit has received the specific data, determine whether the received specific data is abnormal, based on data that has been received by the receiving unit or the second receiving unit, and that is different from the specific data; and, if the receiving unit has received the abnormal specific data, determine that an abnormality has occurred for the data received by the receiving unit.

In a fourth aspect, in the power feeding control apparatus according to an aspect of the present disclosure, the processing unit is configured to: if it is determined that the occurrence of the abnormality has not stopped, instruct to feed power to the selected communication device; and select, from among the plurality of communication devices, a communication device that has not been selected.

In a fifth aspect, in the power feeding control apparatus according to an aspect of the present disclosure, the plurality of communication devices include a second communication device that is not relevant to travel control of the vehicle, and the processing unit is configured to, if it is determined that the abnormality has occurred, select one second communication device that is included in the plurality of communication devices.

In a sixth aspect, in the power feeding control apparatus according to an aspect of the present disclosure, the second communication device is a device with an Automotive Safety Integrity Level (ASIL) of Quality Management (QM).

In a seventh aspect, in the power feeding control apparatus according to an aspect of the present disclosure, the processing unit is configured to: if it is determined that the occurrence of the abnormality has not stopped, instruct to feed power to the selected second communication device; determine whether all second communication devices that are included in the plurality of communication devices have been selected; and, if it is determined that not all of the second communication devices have been selected, select one second communication device that has not been selected.

In an eighth aspect, in the power feeding control apparatus according to an aspect of the present disclosure, the processing unit is configured to: if it is determined that the occurrence of the abnormality has not stopped, instruct to feed power to the selected second communication device; determine whether all second communication devices that are included in the plurality of communication devices have been selected; and if it is determined that all of the second communication devices have been selected and when an ignition switch of the vehicle is off, select one of the plurality of communication devices that have not been selected.

In a ninth aspect, a power feeding control system according to an aspect of the present disclosure includes: a plurality of communication devices that are mounted in a vehicle and connected to a communication bus; and a power feeding control apparatus configured to control power feeding to the plurality of communication devices, wherein the power feeding control apparatus includes: a receiving unit configured to receive data transmitted via the communication bus; and a processing unit configured to execute a process, and the processing unit is configured to: determine whether an abnormality has occurred for the data received by the receiving unit; if it is determined that the abnormality has occurred, select one of the plurality of communication devices; instruct to stop power feeding to the selected communication device; after instructing to stop the power feeding, determine whether the occurrence of the abnormality has stopped; and, if it is determined that the occurrence of the abnormality has stopped, maintain the stopping of the power feeding to the selected communication device.

In a tenth aspect, a power feeding control method according to an aspect of the present disclosure is a power feeding control method for controlling power feeding to a plurality of communication devices that are mounted in a vehicle and connected to a communication bus, the method causing a computer to execute the steps of determining whether an abnormality has occurred for data transmitted via the communication bus; if it is determined that the abnormality has occurred, selecting one of the plurality of communication devices; instructing to stop power feeding to the selected communication device; after instructing to stop the power feeding, determining whether the occurrence of the abnormality has stopped, wherein if it is determined that the occurrence of the abnormality has stopped, the stopping of the power feeding to the selected communication device is maintained.

In the power feeding control apparatus, the power feeding control system, and the power feeding control method according to the above-described aspects, when an abnormality has occurred for the data received via the communication bus, power feeding to one communication device is stopped. Thus, when the occurrence of the abnormality has stopped, the stopping of the power feeding is maintained. Consequently the occurrence of the abnormality can be stopped.

In the power feeding control apparatus according to the above-described aspect, when the data amount of the common data received in the predetermined period is large, the occurrence of an abnormality is detected.

In the power feeding control apparatus according to the above-described aspect, whether the specific data is abnormal is determined based on data that is different from the specific data. When the abnormal specific data has been received, the occurrence of an abnormality is detected.

In the power feeding control apparatus according to the above-described aspect, when the occurrence of the abnormality has not stopped as a result of stopping the power feeding to the selected communication device, the power feeding to the selected communication device is resumed. One of the plurality of communication devices that have not been selected is selected, and the power feeding to the selected communication device is stopped. Thus, the occurrence of the abnormality can be reliably stopped.

In the power feeding control apparatus according to the above-described aspect, when an abnormality has occurred, a second communication device that is not relevant to the travel control of the vehicle is selected, and power feeding to the selected second communication device is stopped.

In the power feeding control apparatus according to the above-described aspect, the second communication device is a device with an ASIL of QM.

In the power feeding control apparatus according to the above-described aspect, when the occurrence of the abnormality has not stopped as a result of stopping the power feeding to the selected second communication device, the power feeding to the selected second communication device is resumed. When not all of the second communication devices have been selected, a second communication device that has not been selected is selected, and the power feeding to the selected second communication device is stopped.

In the power feeding control apparatus according to the above-described aspect, when the occurrence of the abnormality has not stopped as a result of stopping the power feeding to the selected second communication device, the power feeding to the selected second communication device is resumed. When all of the second communication devices have been selected, the processing unit waits until the ignition switch of the vehicle is switched off. When the ignition switch is off, one of the plurality of communication devices that is different from the second communication device is selected, and the power feeding to the selected communication device is stopped.

Specific examples of a communication system (power feeding control system) according to embodiments of the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

Configuration of Communication System

FIG. 1 is a block diagram showing the configuration of relevant portions of a communication system 100 according to Embodiment 1. The communication system 100 is mounted in a vehicle C. The communication system 100 includes a plurality of electronic control units (ECUs) 1, a plurality of ECUs 2, a plurality of ECUs 3, a relay apparatus 4, and a direct current power supply 5. In FIG. 1, connection lines that are relevant to power feeding are indicated by thick lines. Connection lines that are not relevant to power feeding are indicated by fine lines.

Three communication buses B1, B2, and B3 are separately connected to the relay apparatus 4. The plurality of ECUs 1 are connected to the communication bus B1. The plurality of ECUs 2 are connected to the communication bus B2. The plurality of ECUs 3 are connected to the communication bus B3. Each of the ECUs 1, 2, and 3 is grounded. Each of the ECUs 1, 2, and 3 is connected to the relay apparatus 4. The relay apparatus 4 is connected to the positive electrode of the direct current power supply 5. The negative electrode of the direct current power supply 5 is grounded. Grounding can be achieved, for example, by connection to the body of the vehicle C.

One or both of a sensor and an electrical device are connected to each of the ECUs 1, 2, and 3. A sensor detects a vehicle value relating to the vehicle C, including, for example, a speed of the vehicle C, and notifies the detected vehicle value to the ECU connected to the sensor. An operation signal indicating an operation to be executed is input into an electrical device from the corresponding ECU. When an operation signal has been input into the electrical device, the electrical device executes the operation indicated by the input operation signal.

The plurality of ECUs 1 include an ECU 1a that is not relevant to the travel control of the vehicle C, and an ECU 1b that is relevant to the travel control of the vehicle C. Similarly the plurality of ECUs 2 include an ECU 2a that is not relevant to the travel control of the vehicle C, and an ECU 2b that is relevant to the travel control of the vehicle C. The plurality of ECUs 3 include an ECU 3a that is not relevant to the travel control of the vehicle C, and an ECU 3b that is relevant to the travel control of the vehicle C.

The respective numbers of ECUs 1a, 1b, 2a, 2b, 3a, and 3b may be one, or two or more. In the following, an example in which the respective numbers of ECUs 1a, 1b, 2a, 2b, 3a, and 3b are two or more will be described.

For each of the ECUs 1a, 2a, and 3a to which a sensor is connected, the sensor detects a value that is not relevant to the travel control of the vehicle C. For each of the ECUs 1a, 2a, and 3a to which an electrical device is connected, the operation of the electrical device is not relevant to the travel control of the vehicle C. A sensor that detects a value that is relevant to the travel control of the vehicle C, or an electrical device that is relevant to the travel control of the vehicle C is connected to each of the ECUs 1b, 2b, and 3b.

The direct current power supply 5 supplies power to the ECUs 1, 2, and 3 via the relay apparatus 4. A current flows through each of the ECUs 1, 2, and 3 from the positive electrode of the direct current power supply 5 via the relay apparatus 4. A current that has been output from each of the ECUs 1, 2, and 3 flows to the negative electrode of the direct current power supply 5. The relay apparatus 4 separately controls the power feeding to the plurality of ECUs 1, 2, and 3 from the direct current power supply 5. The relay apparatus 4 functions as a power feeding control apparatus. Each of the ECUs 1, 2, and 3 is operated using the power supplied from the direct current power supply 5. Among the plurality of ECUs 1, 2, and 3, ECUs to which no power is supplied from the direct current power supply 5 are deactivated.

The ECUs 1 and the relay apparatus 4 transmit data via the communication bus B1. The ECUs 2 and the relay apparatus 4 transmit data via the communication bus B2. The ECUs 3 and the relay apparatus 4 transmit data via the communication bus B3. The data transmitted via the communication bus B1 is received by all devices that are connected to the communication bus B1. Similarly, the data transmitted via the communication bus B2 is received by all devices that are connected to the communication bus B2. The data transmitted via the communication bus B3 is received by all devices that are connected to the communication bus B3.

The data transmission/reception via each of the communication buses B1, B2, and B3 is performed in accordance with a communication protocol such as Controller Area Network (CAN), Controller Area Network with Flexible Data rate (CAN-FD), Ethernet (registered trademark), Local Interconnect Network (LIN), or Clock Extension Peripheral Interface (CXPI). Note that the communication protocol used for the data transmission/reception via each of the communication buses B1, B2, and B3 may be different from a communication protocol that is used for the data transmission/reception via other communication buses.

Each of the ECUs 1, 2, and 3 functions as a communication device. Each of the ECUs 1*a*, 2*a*, and 3*a* functions as a second communication device. The communication system 100 functions as a power feeding control system.

Identification information is assigned in advance to each of the plurality of ECUs 1, 2, and 3. The identification information is identification data (ID). The data transmitted by the ECUs 1, 2, and 3 via the communication bus B1, B2, or B3, respectively, include the identification information. Based on the identification information, the transmission source of the data including the identification information can be identified.

Each of the ECUs 1, 2, and 3 transmits, for example, data indicating a vehicle value detected by the corresponding sensor. When data has been received, each of the ECUs 1, 2, and 3 determines whether to write the received data into a storage unit (not shown), based on the identification information of the received data. If it is determined that the data is to be written, each of the ECUs 1, 2, and 3 writes the received data into the storage unit. Each of the ECUs 1, 2, and 3 controls the operation of the electrical device connected thereto, for example, based on the data stored in the storage unit. If it is determined that the data is not to be written, each of the ECUs 1, 2, and 3 discards the received data.

The plurality of ECUs 1, 2, and 3 include an ECU that cyclically transmits data. When data has been received from one of the communication buses B1, B2, and B3, the relay apparatus 4 determines whether relaying is required. If it is determined that relaying is not required, the relay apparatus 4 discards the received data. If it is determined that relaying is required, the relay apparatus 4 transmits the data via one of the three communication buses B1, B2, and B3 that is different from the communication bus used to transmit the received data. When the relay apparatus 4 has performed relaying, two ECUs that are respectively connected to two communication buses communicate with each other. For example, an ECU 1 communicates with an ECU 2.

Ignition information indicating on or off of an ignition switch of the vehicle C is cyclically input into the relay apparatus 4. The ignition information indicates the state of the ignition switch at a time point when the ignition information was transmitted.

Configuration of Relay Apparatus 4

Figure 2:
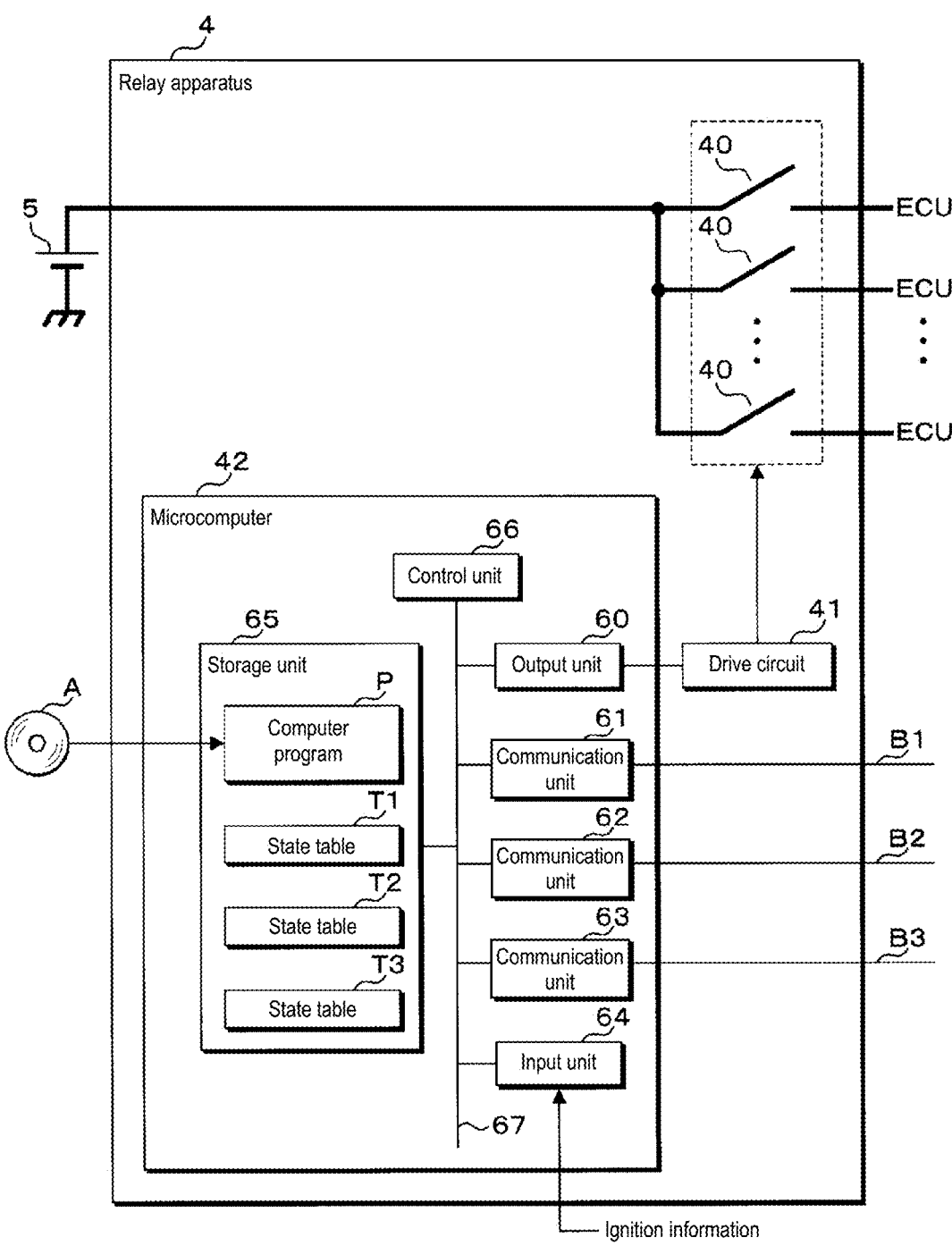
FIG. 2 is a block diagram showing the configuration of relevant portions of a relay apparatus.

FIG. 2 is a block diagram showing the configuration of relevant portions of the relay apparatus 4. The relay apparatus 4 includes a plurality of power switches 40, a drive circuit 41, and a microcomputer 42. In FIG. 2 as well, connection lines that are relevant to power feeding are indicated by thick lines. Connection lines that are not relevant to power feeding are indicated by fine lines.

Each of the plurality of ECUs 1, 2, and 3 is connected to one end of the corresponding power switch 40. The number of power switches 40 matches the total number of ECUs 1, 2, and 3. The other end of each of the power switches 40 is connected to the positive electrode of the direct current power supply 5.

The microcomputer 42 includes an output unit 60, three communication units 61, 62, and 63, an input unit 64, a storage unit 65, and a control unit 66. These units are connected to an internal bus 67. The output unit 60 is further connected to the drive circuit 41. The communication units 61, 62, and 63 are further connected to the communication buses B1, B2, and B3, respectively.

The drive circuit 41 switches each of the plurality of power switches 40 on or off. When the drive circuit 41 has switched a power switch 40 on, the direct current power supply 5 supplies power to the corresponding ECU via the power switch 40 that is on. When the drive circuit 41 has switched a power switch 40 off, the power feeding from the direct current power supply 5 to the corresponding ECU is stopped.

Power is supplied from the direct current power supply 5 to one or more ECUs connected to the power switch 40 that is on, among the plurality of ECUs 1, 2, and 3. No power is supplied to one or more ECUs connected to the power switch 40 that is off, among the plurality of ECUs 1, 2, and 3. As discussed above, ECUs to which no power is supplied are deactivated.

The control unit 66 instructs the output unit 60 to feed power to at least one ECU included in the plurality of ECUs 1, 2, and 3. When the control unit 66 has instructed the output unit 60 to feed power to at least one ECU included in the plurality of ECUs 1, 2, and 3, the output unit 60 instructs the drive circuit 41 to switch on one or more power switches 40 corresponding to the one or more ECUs for which the instruction to feed power has been given. In accordance with the instruction from the output unit 60, the drive circuit 41 switches the one or more power switches 40 on.

The control unit 66 instructs the output unit 60 to stop power feeding to at least one ECU included in the plurality of ECUs 1, 2, and 3. When the control unit 66 has instructed the output unit 60 to stop power feeding to at least one ECU included in the plurality of ECUs 1, 2, and 3, the output unit 60 instructs the drive circuit 41 to switch off one or more power switches 40 corresponding to the one or more ECUs for which the instruction to stop power feeding has been given. In accordance with the instruction from the output unit 60, the drive circuit 41 switches the one or more power switches 40 off.

The communication unit 61 receives data that has been transmitted by each of the plurality of ECUs 1 via the communication bus B1. Similarly, the communication unit 62 receives data that has been transmitted by each of the plurality of ECUs 2 via the communication bus B2. The communication unit 63 receives data that has been transmitted by each of the plurality of ECUs 3 via the communication bus B3. Each of the communication units 61, 62, and 63 functions as a receiving unit. The communication units 61, 62, and 63 transmit data via the communication buses B1, B2, and B3, respectively in accordance with instructions from the control unit 66. The ignition information is cyclically input into the input unit 64.

The storage unit 65 is composed of, for example, a volatile memory and a nonvolatile memory. The storage unit 65 stores three state tables T1, T2, and T3. FIG. 3 is a diagram showing the details of the state table T1. The state table T1 shows the respective pieces of identification information of the plurality of ECUs 1. The state table T1 shows a value of an abnormality flag in association with each of the plurality of pieces of identification information. The value of an abnormality flag indicates whether an abnormality has occurred in an ECU 1. The abnormality flag has a value of 0 or 1. If the abnormality flag has a value of 0, this means that no abnormality has occurred. If the abnormality flag has a value of 1, this means that an abnormality has occurred.

The state table T1 shows an Automotive Safety Integrity Level (ASIL) in association with each of the plurality of pieces of identification information. A, B, C, D, and Quality Management (QM) are defined as the ASIL levels. An ECU with one of the A, B, C, and D levels is an ECU that is relevant to the travel control of the vehicle C. The degree of relevance to the travel control increases in the order of A, B, C, and D. An ECU with the QM level is an ECU that is not relevant to the travel control of the vehicle C. In the example shown in FIG. 3, the four ECUs 1 corresponding to 001 to 004 are ECUs 1b. The two ECUs 1 corresponding to 005 and 006 are ECUs 1a.

As described above, the state table T1 shows the value and the ASIL level of the abnormality flag corresponding to the identification information of each ECU 1. As in the case of the state table T1, the state table T2 shows the value and the ASIL level of the abnormality flag corresponding to the identification information of each ECU 2. As in the case of the state table T1, the state table T3 shows the value and the ASIL level of the abnormality flag corresponding to the identification information of each ECU 3.

Each of the ECUs 1a, 2a, and 3a is an ECU with an ASIL of QM. Each of the ECUs 1b, 2b, and 3b is an ECU with an ASIL of A, B, C, or D. For each of the state tables T1, T2, and T3, the value of the abnormality flag is changed to 0 or 1 by the control unit 66.

The storage unit 65 shown in FIG. 2 stores a computer program P. The control unit 66 includes a processing element, for example, a central processing unit (CPU) that executes processes. The control unit 66 functions as a processing unit. The processing element (computer) of the control unit 66 executes a relay process, three power feeding stop processes, and so forth by executing the computer program P. The relay process is a process of relaying communication between two ECUs connected to two of the three communication buses B1, B2, and B3. The three power feeding stop processes correspond to the three communication buses B1, B2, and B3, respectively. The power feeding stop process corresponding to the communication bus B1 is a process of stopping power feeding to the ECUs 1. Similarly, the power feeding stop process corresponding to the communication bus B2 is a process of stopping power feeding to the ECUs 2. The power feeding stop process corresponding to the communication bus B3 is a process of stopping power heeding to the ECUs 3.

Note that the computer program P may be provided to the microcomputer 42 by using a non-transitory storage medium A that removably stores the computer program P. The storage medium A is a portable memory, for example. Examples of the portable memory include a CD-ROM, a universal serial bus (USB) memory, an SD card, a microSD card, and a Compact Flash (registered trademark). When the storage medium A is a portable memory, the processing element of the control unit 66 may use a reading device (not shown) to read the computer program P from the storage medium A. The read computer program P is written into the storage unit 65. Furthermore, the computer program P may be provided to the microcomputer 42 by a communication unit (not shown) of the microcomputer 42 communicating with an external apparatus. In this case, the processing element of the control unit 66 obtains the computer program P through the communication unit. The obtained computer program P is written into the storage unit 65.

The number of processing elements of the control unit 66 is not limited to one, and may be two or more. When the control unit 66 includes a plurality of processing elements, the plurality of processing elements may execute the relay process and the three power feeding stop processes in cooperation with each other.

Relay Process

In the relay process, the control unit 66 waits until one of the three communication units 61, 62, and 63 receives data. When one of the three communication units 61, 62, and 63 has received data, the control unit 66 determines whether relaying is required, based on the identification information of the received data. If it is determined that relaying is not required, the control unit 66 ends the relay process. If it is determined that relaying is required, the control unit 66 selects, from among the three communication units 61, 62, and 63, a communication unit that transmits the received data. The control unit 66 causes the selected communication unit to transmit the received data. Thus, two ECUs respectively connected to two communication buses among the three communication buses B1, B2, and B3 communicate with each other. After ending the relay process, the control unit 66 executes the relay process again.

Power Feeding Stop Process Corresponding to Communication Bus B1

Figure 4:
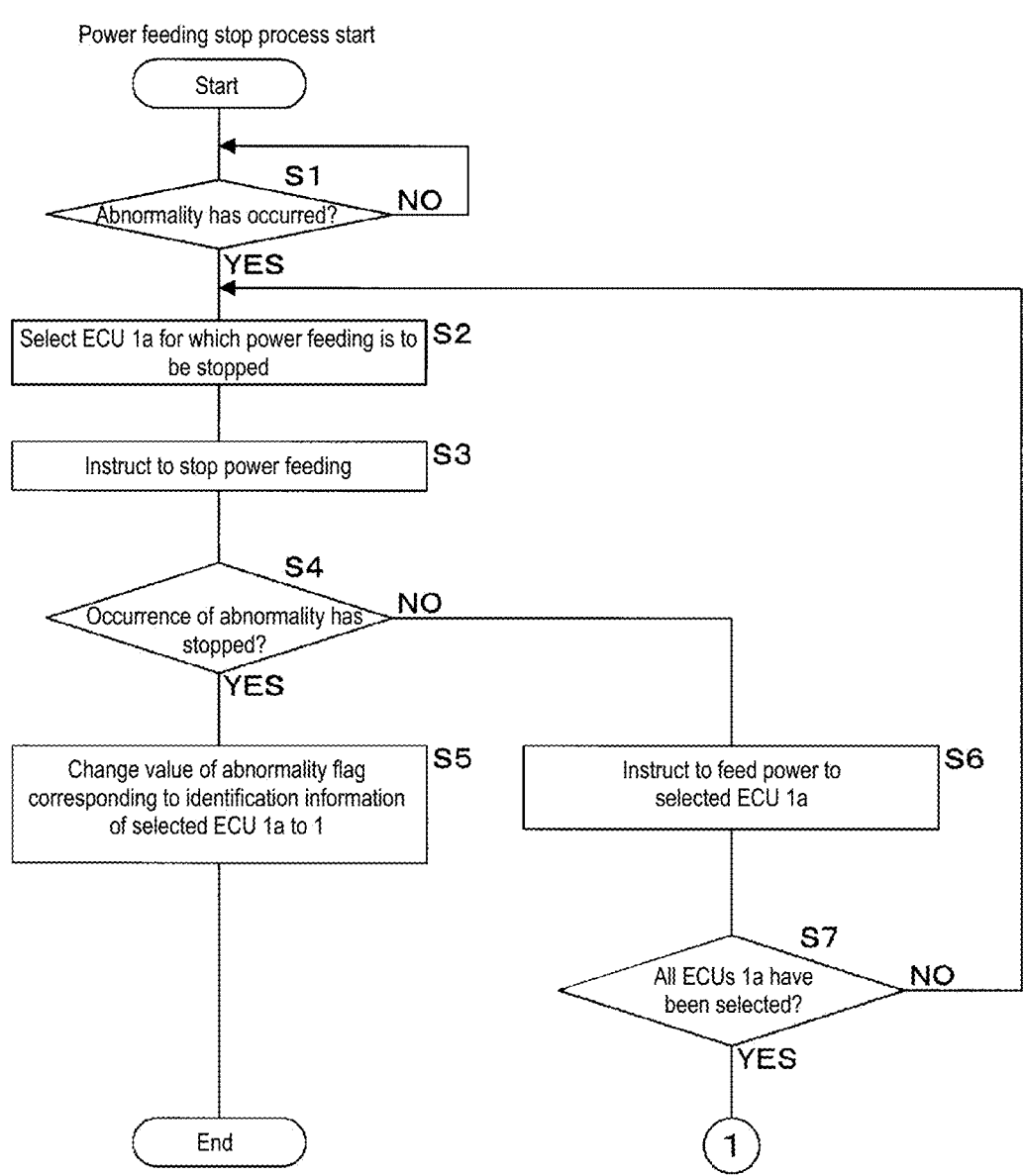
FIG. 4 is a flowchart illustrating the procedure of a power feeding stop process corresponding to a communication bus.
Figure 5:
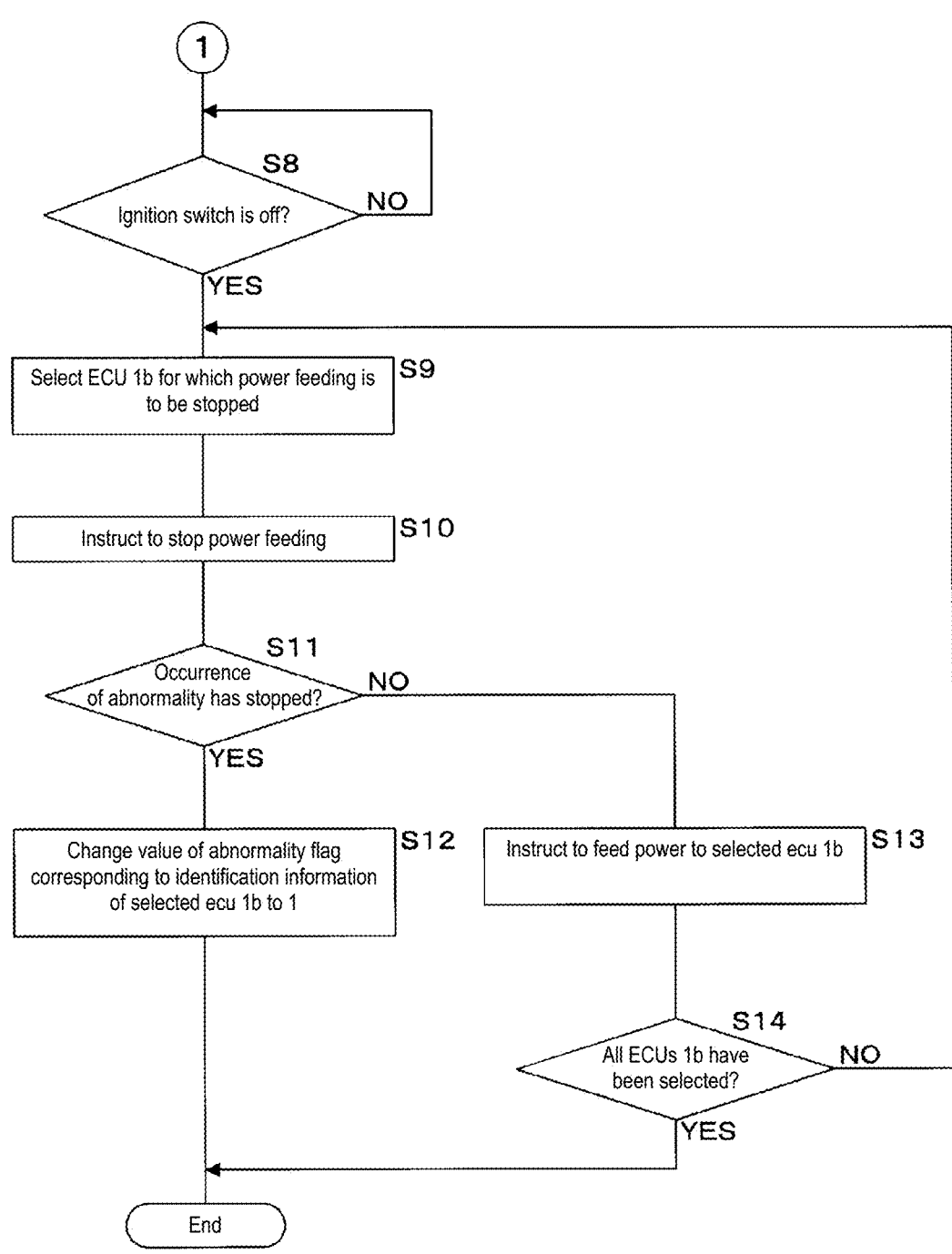
FIG. 5 is a flowchart illustrating the procedure of the power feeding stop process corresponding to the communication bus.

FIGS. 4 and 5 are flowcharts illustrating the procedure of a power feeding stop process corresponding to the communication bus B1. In the state table T1, a power switch 40 connected to an ECU 1 whose abnormality flag has a value of 0 is on. Power is supplied to an ECU 1 whose abnormality flag has a value of 0. A power switch 40 connected to an ECU 1 whose abnormality flag has a value of 1 is off. Power feeding to an ECU 1 whose abnormality flag has a value of 1 is stopped. The following describes the power feeding stop process corresponding to the communication bus B1 when all of the values of the abnormality flags in the state table T1 are 0. In the power feeding stop process corresponding to the communication bus B1, the control unit 66 determines whether an abnormality has occurred for the data received by the communication unit 61 (step S1).

FIG. 6 is a diagram showing conditions for determining an abnormality. If one of conditions 1 and 2 shown in FIG. 6 is satisfied, the control unit 66 determines that an abnormality has occurred in step S1. The condition 1 is that, for common data including common identification information, the data amount of the common data received by the communication unit 61 in a predetermined period is greater than or equal to a threshold. The predetermined period has a constant value, and is set in advance. The starting time point of the predetermined period is a time point preceding, by the predetermined period, the time point at which step S1 has been executed. The ending time point of the predetermined period is a time point at which step S1 has been executed.

The condition 2 is that, for common data including common identification information, the time interval at which the common data is received is less than a predetermined interval. The predetermined interval has a constant value, and is set in advance.

As described above, when the data amount of the common data received in the predetermined period is large, or when the time interval at which the communication unit 61 receives the common data is short, the control unit 66 detects the occurrence of an abnormality in step S1.

If it is determined that no abnormality has occurred (S1: NO), the control unit 66 executes step S1 again. The control unit 66 waits until an abnormality occurs for the data received via the communication bus B1. If it is determined that an abnormality has occurred (S1: YES), the control unit 66 selects, from among the plurality of ECUs 1 connected to the communication bus B1, one ECU 1a to which the power feeding is to be stopped (step S2). If it is determined that an abnormality has occurred in step S1 and when the level of the ECU 1 that is indicated by the identification information of the common data is QM, the control unit 66 selects, in step S2, the ECU 1a indicated by the identification information of the common data, for example.

Next, the control unit 66 instructs the output unit 60 to stop power feeding to the ECU 1a selected in step S2 (step S3). Thus, the drive circuit 41 switches off the power switch 40 connected to the ECU 1a selected in step S2. Consequently the ECU 1a selected in step S2 is deactivated.

After executing step S3, the control unit 66 determines whether the occurrence of the abnormality has stopped (step S4). If the condition 1 is satisfied in step S1, the control unit 66 determines, in step S4, whether the data amount of the common data received by the communication unit 61 in the predetermined period is less than the threshold. If the condition 2 is satisfied in step S1, the control unit 66 determines, in step S4, whether the interval at which the communication unit 61 receives the common data is greater than or equal to the predetermined interval.

If it is determined that the occurrence of the abnormality has stopped (S4: YES), the control unit 66 changes the value of the abnormality flag corresponding to the identification information of the ECU 1a selected in step S2 to 1 in the state table (step S5). The control unit 66 ends the power feeding stop process in a state in which power feeding to the ECU 1a selected in step S2 is stopped. After ending the power feeding stop process, the control unit 66 executes the power feeding stop process corresponding to the communication bus B1 again. The stopping of the power feeding to the ECU 1 whose abnormality flag has a value of 1 is maintained. Accordingly the stopping of the power feeding to the ECU 1a selected in step S2 is maintained.

If it is determined that the occurrence of the abnormality has not stopped (S4: NO), the control unit 66 instructs the output unit 60 to feed power to the ECU 1a selected in step S2 (step S6). Thus, the drive circuit 41 switches on the power switch 40 connected to the ECU 1a selected in step S2. Consequently, the ECU 1a selected in step S2 is activated again.

After executing step S6, the control unit 66 determines whether all of the ECUs 1a have been selected since the start of the power feeding stop process that is being executed (step S7). If it is determined that not all of the ECUs 1a have been selected (S7: NO), the control unit 66 executes step S2 again. In the second and subsequent executions of step S2, the control unit 66 selects, from among the plurality of ECUs, an ECU 1a that has not been selected. If all of the ECUs 1a have been selected, the cause of the occurrence of an abnormality lies in the ECUs 1b.

If it is determined that all of the ECUs 1a have been selected (S7: YES), the control unit 66 determines whether the ignition switch of the vehicle C is on, based on the ignition information input into the input unit 64 (step S8). If it is determined that the ignition switch is not off (S8: NO), the control unit 66 executes step S8 again. The control unit 66 waits until the ignition switch is switched on.

If it is determined that the ignition switch is off (S8: YES), the control unit 66 selects, from among the plurality of ECUs 1 connected to the communication bus B1, an ECU 1b for which the power feeding is to be stopped (step S9). In step S9, the control unit 66 may select, from among the ECUs 1b that have not been selected, the ECU 1b with the lowest ASIL level, or in other words, the lowest degree of relevance to the travel control.

Next, the control unit 66 instructs the output unit 60 to stop power feeding to the ECU 1b selected in step S9 (step S10). Thus, the drive circuit 41 switches off the power switch 40 connected to the ECU 1b selected in step S9. Consequently, the ECU 1b selected in step S9 is deactivated.

After executing step S10, the control unit 66 determines, as in step S4, whether the occurrence of the abnormality has stopped (step S11). If it is determined that the occurrence of the abnormality has stopped (S11: YES), the control unit 66 changes, in the state table T1, the value of the abnormality flag corresponding to the identification information of the ECU 1b selected in step S9 to 1 (step S12). The control unit 66 ends the power feeding stop process in a state in which the power feeding to the ECU 1b selected in step S9 is stopped. In this case, the control unit 66 executes the power feeding stop process again, for example, after the ignition switch has been switched on.

The ECUs 1b are necessary for controlling the travel of the vehicle C. Accordingly when the ignition switch has been switched on, the control unit 66 instructs the output unit 60 to feed power to the power switches 40 connected to all of the ECUs 1b, and changes the values of the abnormality flags corresponding to the identification information of all of the ECUs 1b to 0. When the control unit 66 has changed the values of the abnormality flags corresponding to the identification information of the ECUs 1b to 1, the abnormalities of the ECUs 1b may be notified to the occupant of the vehicle C, for example, by lighting a lamp, or displaying a message.

If it is determined that the occurrence of the abnormality has not stopped (S11: NO), the control unit 66 instructs the output unit 60 to feed power to the ECU 1b selected in step S9 (step S13). Thus, the drive circuit 41 switches on the power switch 40 connected to the ECU 1b selected in step S9. Consequently, the ECU 1b selected in step S9 is activated again.

After executing step S13, the control unit 66 determines whether all of the ECUs 1b have been selected since the start of the power feeding stop process that is being executed (step S14). If it is determined that not all of the ECUs 1b have been selected (S14: NO), the control unit 66 executes step S9 again. In the second and subsequent executions of step S9, the control unit 66 selects an ECU 1b that has not been selected. If all of the ECUs 1b have been selected, the cause of the occurrence of the abnormality is unknown.

If it is determined that all of the ECUs 1b have been selected (S14: YES), the control unit 66 ends the power feeding stop process. In this case, the control unit 66 executes the power feeding stop process again, for example, after the ignition switch has been switched on.

As described above, when an abnormality has occurred for the data received by the communication unit 61 via the communication bus B1, power feeding to one ECU 1*a* is stopped. Accordingly, when the occurrence of the abnormality has stopped, the stopping of the power feeding is maintained. Consequently, the relay apparatus 4 can stop the occurrence of the abnormality.

When the occurrence of the abnormality has not stopped as a result of the drive circuit 41 stopping the power feeding to the ECU 1*a* selected by the control unit 66, the drive circuit 41 resumes the power feeding to the ECU 1*a* selected by the control unit 66. The control unit 66 selects an ECU 1*a* that has not been selected. The drive circuit 41 stops the power feeding to the ECU 1*a* selected by the control unit 66. This enables the relay apparatus 4 to reliably stop the occurrence of the abnormality.

When the occurrence of the abnormality does not stop even after the power feeding to all of the ECUs 1*a* has been stopped, the control unit 66 stops the power feeding to the ECUs 1*b* in a state in which the ignition switch is off, or in other words, in a state in which the travel control is not necessary. Thereafter, the control unit 66 determines whether the occurrence of the abnormality has stopped.

If not all of the values of the abnormality flags in the state table T1 are 0, the control unit 66 selects, in step S2, from among a plurality of ECUs 1 to which power is being supplied, one ECU 1*a* for which the power feeding is to be stopped. In step S7, the control unit 66 determines whether all of the ECUs 1*a* to which power were being supplied at a time point when the power feeding stop process was started have been selected.

Power Feeding Stop Process Corresponding to Communication Bus B2

The control unit 66 executes a power feeding stop process corresponding to the communication bus B2 in the same manner as the power feeding stop process corresponding to the communication bus B1. The ECUs 1, 1*a*, 1*b*, the communication bus B1, and the state table T1 correspond to the ECUs 2, 2*a*, 2*b*, the communication bus B2, and the state table T2, respectively.

Power Feeding Stop Process Corresponding to Communication Bus B3

The control unit 66 executes a power feeding stop process corresponding to the communication bus B3 in the same manner as the power feeding stop process corresponding to the communication bus B1. The ECUs 1, 1*a*, 1*b*, the communication bus B1, and the state table T1 correspond to the ECUs 3, 3*a*, 3*b*, the communication bus B3, and the state table T3, respectively.

Embodiment 2

In Embodiment 1, the control unit 66 detects the occurrence of an abnormality if one of the conditions 1 and 2 shown in FIG. 6 is satisfied. The control unit 66 may detect the occurrence of an abnormality if another condition that is different from the conditions 1 and 2 is satisfied.

In the following, aspects in which Embodiment 2 differs from Embodiment 1 will be described. Components of Embodiment 2 other than those described below are the same as those of Embodiment 1. Therefore, the constituent parts that are the same as those of Embodiment 1 are denoted by the same reference numerals as Embodiment 1, and the description thereof has been omitted.

Configuration of Relay Apparatus 4

Figure 7:
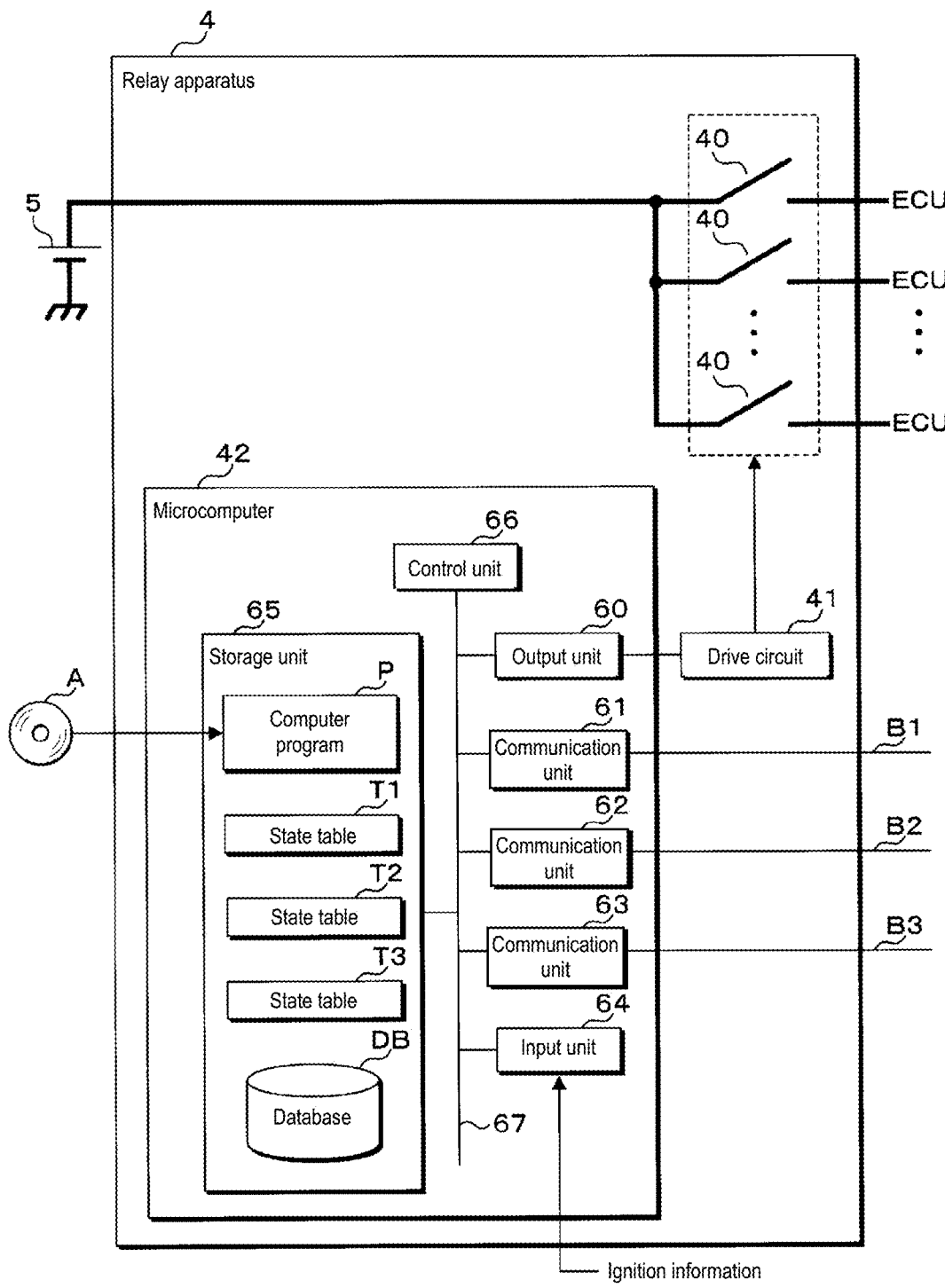
FIG. 7 is a block diagram showing the configuration of relevant portions of a relay apparatus according to Embodiment 2.

FIG. 7 is a block diagram showing the configuration of relevant portions of a relay apparatus 4 according to Embodiment 2. In FIG. 7 as well, connection lines that are relevant to power feeding are indicated by thick lines. Connection lines that are not relevant to power feeding are indicated by fine lines. In Embodiment 2, the storage unit 65 of the microcomputer 42 is provided with a database DB. The data transmitted via the communication bus B1 includes specific data. The specific data is predetermined. The communication unit 61 of the microcomputer 42 repeatedly receives the specific data via the communication bus B1. As discussed in the description in Embodiment 1, the communication units 62 and 63 receive data transmitted via the communication buses B2 and B3, respectively. In Embodiment 2, the communication unit 61 functions as a receiving unit. Each of the communication units 62 and 63 functions as a second receiving unit.

The specific data is predetermined data. The specific data is, for example, position data indicating the position of the vehicle C. The control unit 66 of the microcomputer 42 determines whether the specific data is abnormal, based on determination data that is different from the specific data.

When the specific data is the position data, examples of the determination data include speed data, acceleration data, and steering wheel data. The speed data indicates the speed of the vehicle C. The acceleration data indicates the acceleration of the vehicle C. The steering wheel data is data relating to the rotation of the steering wheel of the vehicle C. The determination data is received by at least one of the three communication units 61, 62, and 63. The control unit 66 detects an abnormality of the specific data (position data) when the position of the vehicle C that is indicated by the position data is significantly different from the position of the vehicle C that is estimated based on the determination data.

The control unit 66 of the microcomputer 42 executes an abnormality detection process, in addition to the relay process and the three power feeding stop processes, by executing the computer program P. The abnormality detection process is a process of detecting an abnormality of the specific data.

Relay Process

Figure 8:
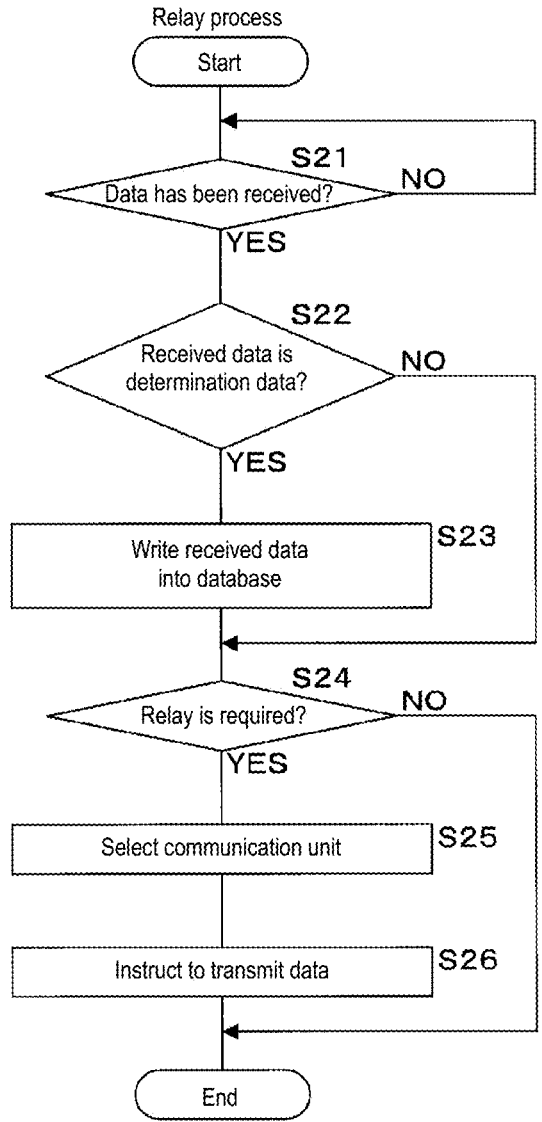
FIG. 8 is a flowchart illustrating the procedure of the relay process.

FIG. 8 is a flowchart illustrating the procedure of the relay process. In the relay process, the control unit 66 determines whether one of the three communication units 61, 62, and 63 has received data (step S21). If it is determined that one of the three communication units 61, 62, and 63 has not received data (S21: NO), the control unit 66 executes step S21 again. The control unit 66 waits until one of the three communication units 61, 62, and 63 receives data.

If it is determined that one of the three communication units 61, 62, and 63 has received data (S21: YES), the control unit 66 determines whether the received data is the determination data (step S22). If it is determined that the received data is the determination data (S22: YES), the control unit 66 writes the received data into the database DB (step S23). If it is determined that the received data is not the determination data (S22: NO), or after step S23 has been executed, the control unit 66 determines whether relaying is required, based on the identification information of the received data (step S24).

If it is determined that relaying is required (S24: YES), the control unit 66 selects, from among the three communication units 61, 62, and 63, a communication unit that transmits the received data (step S25). The communication unit selected in step S25 is different from the communication unit that has received the data. Next, the control unit 66 instructs the communication unit selected in step S25 to transmit the received data (step S26). If it is determined that relaying is not required (S24: NO), or after step S26 has been executed, the control unit 66 ends the relay process. After ending the relay process, the control unit 66 executes the relay process again.

As described above, in the relay process, the control unit 66 writes the determination data into the database DB.

Abnormality Detection Process

FIG. 9 is a flowchart illustrating the procedure of an abnormality detection process. In the abnormality detection process, the control unit 66 determines whether the communication unit 61 has received the specific data (step S31). If it is determined that the communication unit 61 has not received the specific data (S31: NO), the control unit 66 executes step S31 again. The control unit 66 waits until the communication unit 61 receives the specific data.

If it is determined that the communication unit 61 has received the specific data (S31: YES), the control unit 66 determines whether the specific data received by the communication unit 61 is abnormal, based on one or more determination data stored in the database DB (step S32). As described previously when the details indicated by the specific data are significantly different from the details estimated based on the one or more determination data, the control unit 66 determines that the specific data is abnormal. Otherwise, the control unit 66 determines that the specific data is not abnormal.

If it is determined that the specific data is abnormal (S32: YES), the control unit 66 discards the specific data received by the communication unit 61 (step S33). If it is determined that the specific data is not abnormal (S32: NO), or after step S33 has been executed, the control unit 66 ends the abnormality detection process. After ending the abnormality detection process, the control unit 66 executes the abnormality detection process again.

For example, the specific data received by the communication unit 61 is configured to be transmitted to the ECUs 2 by the communication unit 62 in the relay process. With this configuration, when the specific data received by the communication unit 61 is abnormal, the specific data will not be transmitted by the communication unit 62 in the relay process. When the specific data received by the communication unit 61 is not abnormal, the specific data is transmitted by the communication unit 62 in the relay process.

Power Feeding Stop Process Corresponding to Communication Bus B1

The control unit 66 executes a power feeding stop process corresponding to the communication bus B1 in the same manner as in Embodiment 1. In step S1 of the power feeding stop process in Embodiment 2, if one of conditions 1 to 3 is satisfied, the control unit 66 determines that an abnormality has occurred for data receive by the communication unit 61.

FIG. 10 is a diagram showing conditions for determining an abnormality. As shown in FIG. 10, the condition 3 is that the communication unit 61 receives abnormal specific data. Therefore, if it is determined that the specific data received by the communication unit 61 is abnormal in the abnormality detection process, the control unit 66 determines, in step S1, that an abnormality has occurred. Accordingly, when the communication unit 61 has received abnormal specific data, the control unit 66 detects the occurrence of an abnormality.

If the condition 3 is satisfied in step S1, the control unit 66 determines, in each of steps S4 and S11 of the power feeding stop process, whether the communication unit 61 has repeatedly received the specific data and the reception of the abnormal specific data has stopped. If it is determined that the communication unit 61 has repeatedly received the specific data and the reception of the abnormal specific data has stopped, the control unit 66 determines that the occurrence of the abnormality has stopped.

Power Feeding Stop Processes Corresponding to Communication Buses B2 and B3

The communication units 62 and 63 do not receive specific data. Accordingly the control unit 66 executes power feeding stop processes respectively corresponding to the communication buses B2 and B3 in the same manner as in Embodiment 1.

Effects of Relay Apparatus 4

The relay apparatus 4 according to Embodiment 2 similarly achieves the effects achieved by the relay apparatus 4 according to Embodiment 1.

Modifications

In Embodiments 1 and 2, all of the ECUs 1 may be ECUs 1a. In this case, there is no ECU 1b, and therefore the control unit 66 does not need to execute steps S8 to S14 of the power feeding stop process corresponding to the communication bus B1. If it is determined that all of the ECUs 1a have been selected (S7: YES), the control unit 66 ends the power feeding stop process. Similarly all of the ECUs 2 may be ECUs 2a. All of the ECUs 3 may be ECUs 3a. The details of each of the power feeding stop processes corresponding to the communication buses B2 and B3 can be changed as appropriate in the same manner as in the case of the power feeding stop process corresponding to the communication bus B1.

In Embodiments 1 and 2, the number of communication buses connected to the relay apparatus 4 may be any number greater than or equal to two. Therefore, the number of communication buses connected to the relay apparatus 4 is not limited to three. The number of power feeding stop processes matches the number of communication buses. In Embodiment 1, the number of communication buses connected to the relay apparatus 4 may be one. In this case, the control unit 66 of the relay apparatus 4 separately controls power feeding to the plurality of ECUs, without executing the relay process. The relay apparatus 4 functions as a power feeding control apparatus that does not have a relaying function.

In Embodiments 1 and 2, the timing at which the control unit 66 stops the power feeding to the ECU that is relevant to the travel control of the vehicle C is not limited to a timing at which the ignition switch is off, and may be, for example, a timing at which the vehicle C has been parked.

The technical features (constituent elements) described in Embodiments 1 and 2 can be combined with each another, and such combination can form a new technical feature.

It should be appreciated that Embodiments 1 and 2 disclosed herein are to be construed in all respects as illustrative and not limiting. The scope of the present disclosure is defined by the claims, rather than by the description preceding them, and is intended to include all modifications which fall within the scope of the claims and the meaning and scope of equivalents thereof.

The invention claimed is:

1. A power feeding control apparatus configured to control power feeding to a plurality of communication devices that are mounted in a vehicle and connected to a communication bus, the apparatus comprising:
   a receiving unit electrically connected to the communication bus and configured to receive data transmitted along the communication bus; and
   a processing unit configured to execute a process, wherein the processing unit is configured to:

determine whether an abnormality has occurred for the data received by the receiving unit;

if it is determined that the abnormality has occurred, select one of the plurality of communication devices;

instruct to stop power feeding to the selected communication device;

after instructing to stop the power feeding, determine whether the occurrence of the abnormality has stopped; and, when it is determined that an abnormality is present, the processor selects another one of the plurality of communication devices and determines if an abnormality is present, and when it is determined that the occurrence of the abnormality has stopped, maintain the stopping of the power feeding to the selected communication device.

2. The power feeding control apparatus according to claim 1, wherein the data transmitted via the communication bus includes identification information for identifying a transmission source of the data, and, for common data including common identification information, if a data amount of the common data received by the receiving unit in a predetermined period is greater than or equal to a threshold, the processing unit determines that the abnormality has occurred.

3. The power feeding control apparatus according to claim 1, further including;

a second receiving unit electrically connected to a second communication bus that is different from the communication bus and configured to receive data transmitted along the second communication bus, wherein the data transmitted via the communication bus includes predetermined specific data, and the processing unit is configured to:

if the receiving unit has received the specific data, determine whether the received specific data is abnormal, based on data that has been received by the receiving unit or the second receiving unit, and that is different from the specific data; and, if the receiving unit has received the abnormal specific data, determine that an abnormality has occurred for the data received by the receiving unit.

4. The power feeding control apparatus according to claim 1, wherein the processing unit is configured to:

if it is determined that the occurrence of the abnormality has not stopped, instruct to feed power to the selected communication device; and select, from among the plurality of communication devices, a communication device that has not been selected.

5. The power feeding control apparatus according to claim 1, wherein the plurality of communication devices include a second communication device that is not relevant to travel control of the vehicle, and the processing unit is configured to, if it is determined that the abnormality has occurred, select one second communication device that is included in the plurality of communication devices.

6. The power feeding control apparatus according to claim 5, wherein the second communication device is a device with an Automotive Safety Integrity Level (ASIL) of Quality Management (QM).

7. The power feeding control apparatus according to claim 5, wherein the processing unit is configured to:

if it is determined that the occurrence of the abnormality has not stopped, instruct to feed power to the selected second communication device;

determine whether all second communication devices that are included in the plurality of communication devices have been selected; and, if it is determined that not all of the second communication devices have been selected, select one second communication device that has not been selected.

8. The power feeding control apparatus according to claim 5, wherein the processing unit is configured to:

if it is determined that the occurrence of the abnormality has not stopped, instruct to feed power to the selected second communication device;

determine whether all second communication devices that are included in the plurality of communication devices have been selected; and if it is determined that all of the second communication devices have been selected and when an ignition switch of the vehicle is off, select one of the plurality of communication devices that have not been selected.

9. A power feeding control system comprising:

a plurality of communication devices that are mounted in a vehicle and connected to a communication bus; and a power feeding control apparatus configured to control power feeding to the plurality of communication devices, wherein the power feeding control apparatus includes:

a receiving unit electrically connected to the communication bus and configured to receive data transmitted along the communication bus; and a processing unit configured to execute a process, and the processing unit is configured to:

determine whether an abnormality has occurred for the data received by the receiving unit;

if it is determined that the abnormality has occurred, select one of the plurality of communication devices;

instruct to stop power feeding to the selected communication device;

after instructing to stop the power feeding, determine whether the occurrence of the abnormality has stopped; and, when it is determined that an abnormality is present, the processor selects another one of the plurality of communication devices and determines if an abnormality is present, and when it is determined that the occurrence of the abnormality has stopped, maintain the stopping of the power feeding to the selected communication device.

10. A power feeding control method for controlling power feeding to a plurality of communication devices that are mounted in a vehicle and connected to a communication bus, the method causing a computer to execute the steps of:

determining whether an abnormality has occurred for data transmitted via the communication bus;

if it is determined that the abnormality has occurred, selecting one of the plurality of communication devices;

instructing to stop power feeding to the selected communication device;

after instructing to stop the power feeding, determining whether the occurrence of the abnormality has stopped, and when it is determined that an abnormality is present, the processor selects another one of the plurality of communication devices and determines if an abnormality is present, and wherein when it is determined that the occurrence of the abnormality has stopped, the stopping of the power feeding to the selected communication device is maintained.

11. The power feeding control apparatus according to claim 2, further comprising a second receiving unit electrically connected to a second communication bus that is different from the communication bus and configured to receive data transmitted along the second communication bus, wherein the data transmitted via the communication bus includes predetermined specific data, and the processing unit is configured to:

if the receiving unit has received the specific data, determine whether the received specific data is abnormal, based on data that has been received by the receiving unit or the second receiving unit, and that is different from the specific data; and, if the receiving unit has received the abnormal specific data, determine that an abnormality has occurred for the data received by the receiving unit.

12. The power feeding control apparatus according to claim 2, wherein the processing unit is configured to:

if it is determined that the occurrence of the abnormality has not stopped, instruct to feed power to the selected communication device; and select, from among the plurality of communication devices, a communication device that has not been selected.

13. The power feeding control apparatus according to claim 3, wherein the processing unit is configured to:

if it is determined that the occurrence of the abnormality has not stopped, instruct to feed power to the selected communication device; and select, from among the plurality of communication devices, a communication device that has not been selected.

14. The power feeding control apparatus according to claim 2, wherein the plurality of communication devices include a second communication device that is not relevant to travel control of the vehicle, and the processing unit is configured to, if it is determined that the abnormality has occurred, select one second communication device that is included in the plurality of communication devices.

15. The power feeding control apparatus according to claim 3, wherein the plurality of communication devices include a second communication device that is not relevant to travel control of the vehicle, and the processing unit is configured to, if it is determined that the abnormality has occurred, select one second communication device that is included in the plurality of communication devices.

16. The power feeding control apparatus according to claim 4, wherein the plurality of communication devices include a second communication device that is not relevant to travel control of the vehicle, and the processing unit is configured to, if it is determined that the abnormality has occurred, select one second communication device that is included in the plurality of communication devices.

17. The power feeding control apparatus according to claim 6, wherein the processing unit is configured to:

if it is determined that the occurrence of the abnormality has not stopped, instruct to feed power to the selected second communication device;

determine whether all second communication devices that are included in the plurality of communication devices have been selected; and, if it is determined that not all of the second communication devices have been selected, select one second communication device that has not been selected.

18. The power feeding control apparatus according to claim 6, wherein the processing unit is configured to:

if it is determined that the occurrence of the abnormality has not stopped, instruct to feed power to the selected second communication device;

determine whether all second communication devices that are included in the plurality of communication devices have been selected; and if it is determined that all of the second communication devices have been selected and when an ignition switch of the vehicle is off, select one of the plurality of communication devices that have not been selected.

19. The power feeding control apparatus according to claim 7, wherein the processing unit is configured to:

if it is determined that the occurrence of the abnormality has not stopped, instruct to feed power to the selected second communication device;

determine whether all second communication devices that are included in the plurality of communication devices have been selected; and if it is determined that all of the second communication devices have been selected and when an ignition switch of the vehicle is off, select one of the plurality of communication devices that have not been selected.

\*  \*  \*  \*  \*